A. F. ANDERSON.
SHEET METAL ARTICLE.
APPLICATION FILED MAY 2, 1917
1,299,415.
Patented Apr. 8, 1919.
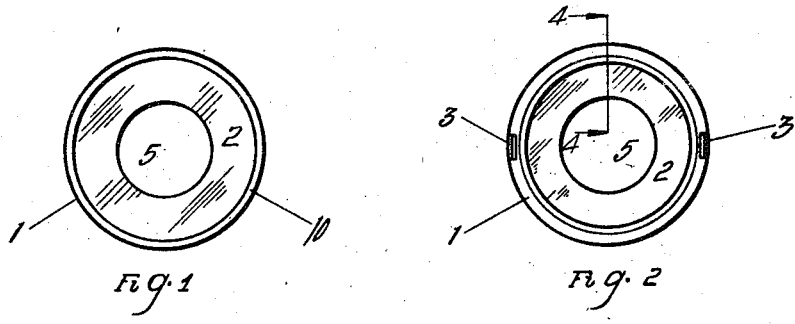
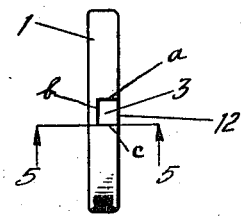
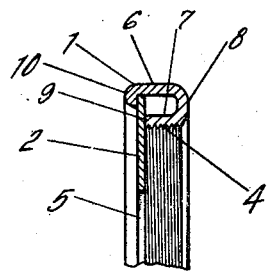 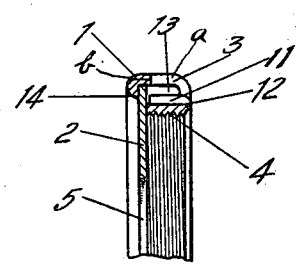
AXEL F. ANDERSON, INVENTOR,
BY
his ATTORNEY.

UNITED STATES PATENT OFFICE.

AXEL F. ANDERSON, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

SHEET-METAL ARTICLE.

1,299,415.  Specification of Letters Patent.  Patented Apr. 8, 1919.

Application filed May 2, 1917. Serial No. 166,031.

*To all whom it may concern:*

Be it known that I, AXEL F. ANDERSON, a citizen of the United States, residing at Bristol, county of Hartford, State of Connecticut, have invented a certain new and useful Sheet-Metal Article, of which the following is a full, clear, and exact description, such as will enable others skilled in the art to which it appertains to make and use the same, reference being had to the accompanying drawings, forming part of this specification.

My invention relates to sheet metal articles and more particularly to a combined check nut and washer.

It has heretofore been the practice to make from solid bar stock the nut-unit of the combined nut and washer which is screwed upon the sprocket-end of a cycle hub to check the sprocket with its nut-unit and to protect the adjacent ball race with its washer-unit. Because of the great waste of material incident to manufacturing from solid bar stock, this nut-unit, and hence the article, was expensive. Moreover, because of its solid wall, it was heavy. I have devised a sheet metal combined check nut and washer which, while applicable to the various uses to which the old type was adapted, is much lighter and much less expensive to manufacture than the old type.

One object of my invention is to provide a light and inexpensive combined shell and cap.

Another object of my invention is to provide a light and inexpensive combined check nut and washer.

To these ends and also to improve generally on devices of the character indicated my invention consists in the various matters hereinafter described and claimed.

In the accompanying drawings:

Figure 1 is a front view of an article embodying my invention;

Fig. 2 is a rear view of said article;

Fig. 3 is an edge view of the same;

Fig. 4 is an enlarged section on line 4—4 of Fig. 2; and

Fig. 5 is an enlarged section on line 5—5 of Fig. 3.

In general, the illustrated article comprises a sheet metal nut-unit or shell 1, open from end to end and with its wall made hollow to give desired thickness combined with lightness. Supported by the shell near one of the ends thereof is a washer-unit or cap 2, of sheet metal. As shown, the edge of the nut-unit is provided with a suitable number of spanner holds 3, 3, and the interior of the unit is provided with screw threads 4. The washer-unit, as here shown, is provided with a central aperture 5 to permit, say, the passage of the cone of the bearing which the washer-unit may be used to protect.

The shell consists (see Fig. 4) of a single piece of sheet metal bent to provide an outer wall-portion 6, an inner wall-portion 7, substantially parallel to the outer one, and an end wall-portion 8 at substantially right angles to the wall-portions 6 and 7 and connecting them. The inner wall-portion is of less length than the outer one and presents at its free end an annular shelf or abutment 9. The free end of the outer wall-portion lies adjacent to the abutment 9 and is inturned to provide a retaining flange 10. The cap 2 is fitted into the end of the shell and rests against the abutment 9, being held thereagainst by the flange 10.

Each spanner hold or recess 3 is conveniently produced by cutting the outer wall member 6 along the lines *a*, *b*, and *c* (indicated particularly in Fig. 3), thus producing a tongue or tab 11, and bending this tab along the uncut, hinge portion 12 until such tab rests against the inner wall, as shown particularly in Fig. 5. Thus the spanner holds are readily produced; furthermore, the inner and outer walls 7 and 6 being spaced from each other (whereby a firm hold results for the washer 2), ample space is provided for the sunken tab 11, as shown in Fig. 5, thus getting the tab out of the way of the spanner or other tool without the necessity of entirely removing the tab portion from the remainder of the wall 6; and, also the sunken tab, to the extent of its thickness of material, tends to close the entrance, 13, to the space between the walls 6 and 7 and to thus exclude some dirt or other foreign matter which might otherwise get into such space.

By providing the spanner holds in a wall, as 6, which is other than the wall, as 7, on which the threads are provided, not only are the spanner holds quickly and cheaply produced without forming an opening (which might admit dirt) in what may be termed the "closure wall" of the article (*i. e.*, the wall having the threads and engaging the part with which the article is used), but also the threads remain uninterrupted.

The flange 10 is preferably beveled on its edge as indicated at 14 to facilitate its being bent over onto the washer-unit 2. The threads 4 may be provided in any suitable manner.

By making the washer-unit from a piece of metal wholly separate from that from which I make the nut-unit I am able to use much simpler and less expensive dies in the forming of the nut-unit, and am also able to keep the whole manufacturing procedure generally more simple than would be the case with an article in which it is attempted to make a nut-unit and a washer-unit from a single piece.

The article may be manufactured in any convenient and proper way. I have found it satisfactory to proceed as follows: (1) provide a flat metal annulus; (2) form the annulus into the wall-portions 6, 7 and 8, by suitable pressing, not yet turning in the metal provided for the flange 10; (3) provide the spanner holds; (4) provide the screw threads; (5) bevel the edge of the metal provided for the flange 10; and (6) insert the washer-unit 2 and turn down the flange 10.

The shell and the cap may be made of any suitable shape adapting them to match with the pieces with which they are designed to coöperate; usually, of course, they are made circular, as illustrated.

It will be seen that I have provided an article of the character indicated which is light and strong, and inexpensive to manufacture.

Having thus described my invention, what I claim as new and desire to secure by Letters Patent is:

1. A sheet metal article comprising a single-piece shell open from end to end and composed of an inner and an outer side wall-portion and a connecting wall-portion, each of said side wall-portions presenting a free edge adjacent the free edge of the other, the said edge of the inner wall-portion providing an interior abutment and the said edge of the outer wall-portion providing a retaining flange, said article also comprising a cap received upon said abutment and held thereon by said flange; substantially as described.

2. A sheet metal article of the character indicated, comprising a shell having inner and outer side walls, one of said walls having therein a recess adapted to receive a tool; substantially as described.

3. A sheet metal article of the character indicated, comprising a shell having inner and outer side walls, one of said walls being threaded and the other having therein a recess adapted to receive a tool; substantially as described.

4. A sheet metal article comprising a shell having inner and outer side walls spaced from each other, a portion of one of said walls being sunken into the space between said walls; substantially as described.

5. A sheet metal article comprising a shell having inner and outer side walls spaced from each other, a portion of one of said walls being partially separated from the remainder thereof and sunken into the space between said walls; substantially as described.

6. A sheet metal combined nut and washer comprising a cylindrical single-piece nut-unit open from end to end and composed of an inner and an outer side wall-portion and a connecting wall-portion, said inner wall-portion being threaded upon its exposed surface and said outer wall-portion having a piece of the metal cut therefrom to provide a recess in the exterior periphery of said wall thereby to provide a hold, and each of said side wall-portions presenting a free edge adjacent the free edge of the other, the said edge of the inner wall-portion providing an interior abutment and the said edge of the outer wall-portion providing a retaining flange, said article also comprising a washer-unit received upon said abutment and held thereon by said flange; substantially as described.

7. A sheet metal article comprising a shell having connected inner and outer side walls spaced from each other and having their free edges at the same side of the article, said inner wall being threaded and said outer wall having a portion partially separated from the remainder and sunken into the space between said walls, an inwardly extending flange at the free edge of said outer wall, and a washer between said flange and the free edge of said inner wall; substantially as described.

In testimony whereof I hereunto affix my signature.

AXEL F. ANDERSON.